(12) United States Patent
Leet et al.

(10) Patent No.: US 9,038,976 B2
(45) Date of Patent: May 26, 2015

(54) SPORTING GEAR STORAGE SYSTEM

(76) Inventors: Patrick John Leet, Plainwell, MI (US);
Leonardo Augusto Pomodoro,
Kalamazoo, MI (US); Christian Ariel Pomodoro, San Francisco, CA (US)

( * ) Notice: Subject to any disclaimer, the term of this patent is extended or adjusted under 35 U.S.C. 154(b) by 0 days.

(21) Appl. No.: 13/550,279

(22) Filed: Jul. 16, 2012

(65) Prior Publication Data
US 2013/0048821 A1   Feb. 28, 2013

Related U.S. Application Data

(60) Provisional application No. 61/572,422, filed on Jul. 15, 2011.

(51) Int. Cl.
| | |
|---|---|
| *F16B 2/12* | (2006.01) |
| *A63B 71/00* | (2006.01) |
| *A63C 11/02* | (2006.01) |
| *F16M 11/04* | (2006.01) |
| *A47F 5/08* | (2006.01) |
| *A47F 7/00* | (2006.01) |
| *A47B 81/00* | (2006.01) |
| *A63C 5/03* | (2006.01) |

(52) U.S. Cl.
CPC ............... *A63B 71/0036* (2013.01); *A47F 5/08* (2013.01); *F16B 2/12* (2013.01); *A63B 71/0045* (2013.01); *A63B 2244/19* (2013.01); *A47F 7/0035* (2013.01); *A47B 81/005* (2013.01); *A63C 5/03* (2013.01); *A63C 11/028* (2013.01); *F16M 11/041* (2013.01)

(58) Field of Classification Search
USPC .............. 248/475.1, 476, 478, 480, 489, 690, 248/229.22, 229.24, 231.41, 231.61, 248/229.25, 231.71, 316.4, 316.6; 211/85.7, 70.5, 117, 113, 89.01
See application file for complete search history.

(56) References Cited

U.S. PATENT DOCUMENTS

| | | | | |
|---|---|---|---|---|
| 2,632,971 | A * | 3/1953 | Manczek et al. ................ | 40/741 |
| 2,696,962 | A * | 12/1954 | Goss ............................. | 248/477 |
| 3,188,028 | A * | 6/1965 | Waller ......................... | 248/489 |
| 3,590,510 | A * | 7/1971 | Salz .............................. | 40/739 |
| 4,223,864 | A * | 9/1980 | Harlow ......................... | 248/490 |
| 5,265,929 | A * | 11/1993 | Pelham ......................... | 296/97.6 |
| 5,836,563 | A * | 11/1998 | Hsin-Yung ................ | 248/316.4 |
| 6,370,741 | B1 * | 4/2002 | Lu .................................. | 24/523 |
| 6,585,212 | B2 * | 7/2003 | Carnevali ................. | 248/346.07 |
| 6,896,249 | B1 * | 5/2005 | Ferrara ......................... | 269/154 |
| 7,219,866 | B2 * | 5/2007 | Depay et al. ............. | 248/229.22 |
| 7,356,960 | B1 * | 4/2008 | Knitt ................................ | 42/94 |
| 7,837,166 | B2 * | 11/2010 | Liao et al. ................. | 248/229.22 |
| 8,240,628 | B2 * | 8/2012 | Huang .......................... | 248/316.1 |
| 8,424,825 | B2 * | 4/2013 | Somuah ..................... | 248/316.4 |
| 8,840,080 | B1 * | 9/2014 | Gordon ......................... | 248/546 |
| 2012/0280101 | A1 * | 11/2012 | Bouverie et al. ........... | 248/316.4 |

* cited by examiner

*Primary Examiner* — Alfred J Wujciak
(74) *Attorney, Agent, or Firm* — Kintner IP, LLC; Mary Frances Ludwig

(57) ABSTRACT

A surface mounted sports gear display apparatus capable of holding a wide range of equipment types and sizes implementing a transverse sliding tension mechanism that adjusts in width and applies a tension force on opposing grip members and that apply a compressive force on the displayed object which creates frictional contact on the long edges between the displayed object and grip members allowing the object to be held horizontally, vertically or diagonally. Additionally a center double-edged grip member can be added creating an expanded functionality for pairs of objects such as skis. The grip edge shape can be altered to enhance surface contact for objects such as surf boards, baseball bats, tennis rackets, kayak and canoe paddles, and rowing ores.

7 Claims, 10 Drawing Sheets

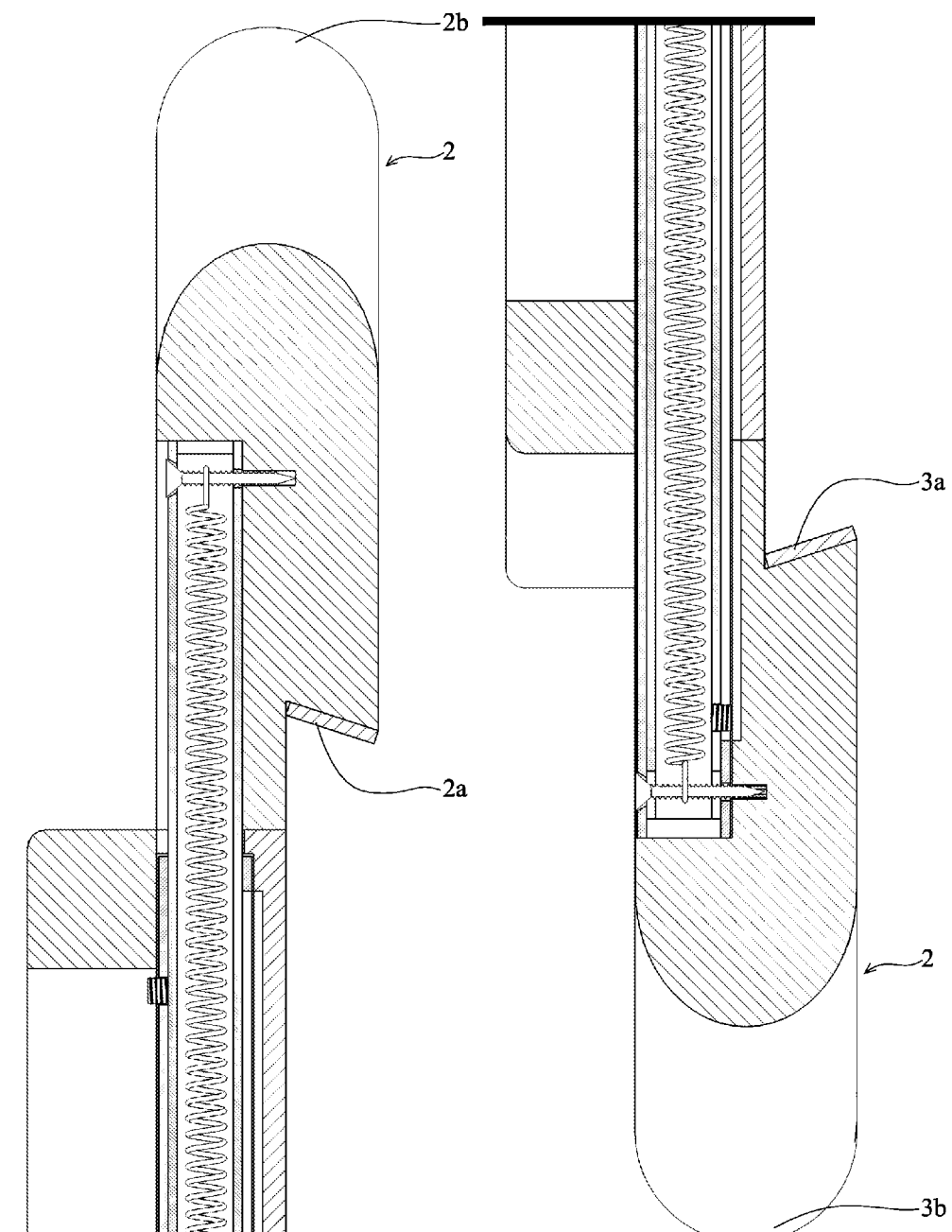
*FIG-18*　　　*FIG-19*

SPORTING GEAR STORAGE SYSTEM

The present application claims priority to U.S. provisional application 61/572,422, filed Jul. 15, 2011, which is incorporated herein by reference its entirety.

BACKGROUND OF THE INVENTION

The types of sporting gear available to the consumer have increased greatly in recent years. As more and more people are actively engaged in sporting activities, their investment in sporting gear has increased as well. Along with the increased costs of sporting gear, the design and styling of sporting gear has also increased greatly.

These highly-styled sporting gear items can be considered works of art and are not simply functional devices without aesthetic value. On the contrary, these items are highly prized and valued by their owners, who wish to display them to others to enjoy and appreciate, or if the items are intended for sale, to display them to potential customers in an appealing and sophisticated manner. For example, snowboards, surfboards, skateboards, skis and hockey sticks are in many cases highly decorated and may be unique, custom-made items that an owner wishes to display.

Although consumers today have many options available to them in regards with how to attach their sports equipment on a surface such as a wall, most of these options are strictly functional in nature focusing on simply being a storage apparatus and tending to lack an aesthetic appeal especially when the sport object is not in place leaving the apparatus exposed for all to see. Also many of these apparatuses have a limited scope of functionality being only for one specific sport.

Many sport enthusiasts have a desire to display their sport equipment within their home or office. Retailers also are in need of an apparatus that showcases their latest sport equipment for sale. These groups need an apparatus that can handle a wide range of sizes and shapes which would allow for example one apparatus to hold skateboards, snowboards, powder skis or cross country skis or a similar embodiment to allow for baseball bats, tennis rackets, hockey sticks, kayak and canoe paddles, and rowing ores. There is also a need for an apparatus to allow for horizontal, vertical, or diagonal installations maximizing flexibility and choice of placement for the sport enthusiast or retailer.

What is needed then is a system for mounting and displaying sporting gear that securely holds the gear in place but also allows a user to simply and easily remove the gear when desired. The present invention is directed to a system for the mounting and displaying of sport equipment including but not limited to: skateboards, longboards, snowboards, wakeboards, surfboards, snowskates, downhill skis, powder skis, cross country skis, skate skis, baseball bats, hockey sticks, tennis rackets, and paddles.

Objects, features and advantages of the present invention will be readily appreciated as the same becomes better understood after reading the subsequent description taken in connection with the accompanying drawings.

BRIEF DESCRIPTION OF THE DRAWINGS

FIG. 18 illustrates upper portion of section highlighting the closed position of the double transverse sliding tension mechanism 9 and how it interfaces with the other members on at least one embodiment of the present invention without the double edged grip member 4.

FIG. 19 illustrates lower portion of section highlighting the closed position of the double transverse sliding tension mechanism 9 and how it interfaces with the other members on at least one embodiment of the present invention without the double edged grip member 4.

DETAILED DESCRIPTION

Figure 1:
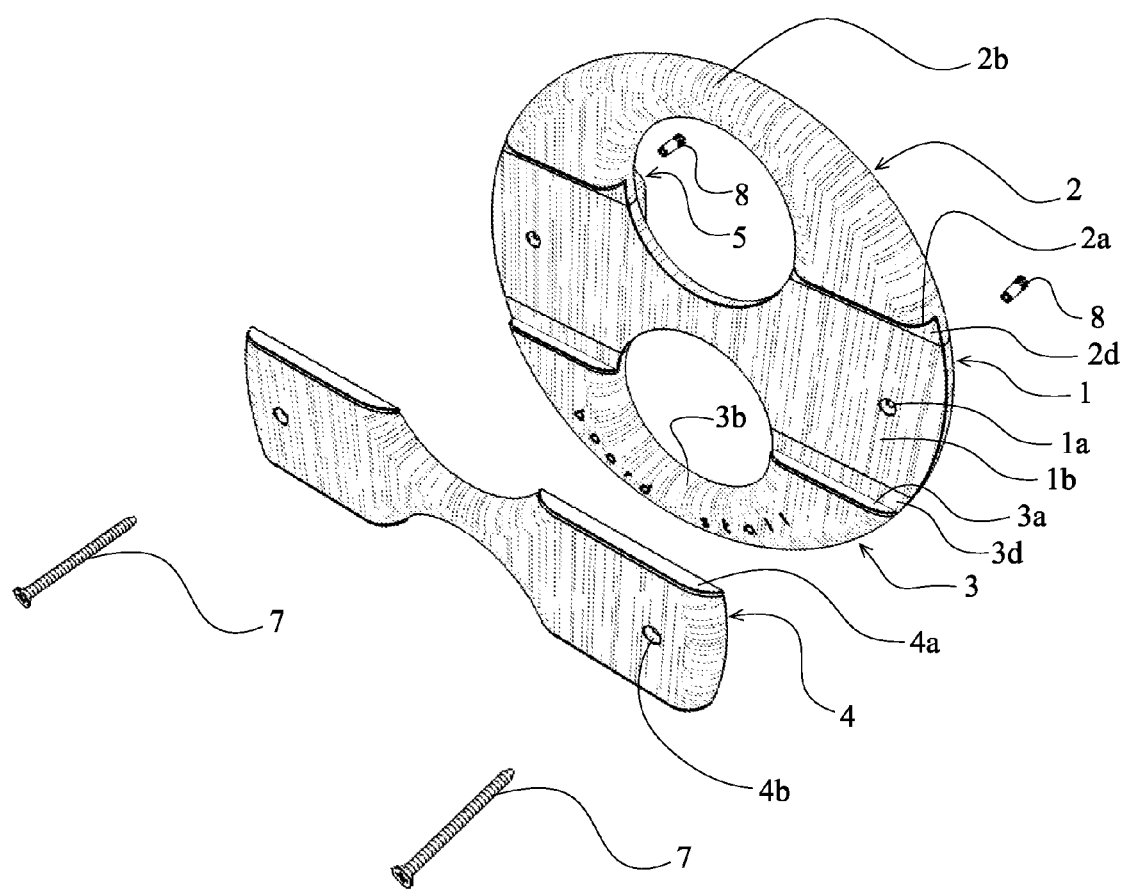
FIG. 1 illustrates a front perspective of at least one embodiment of the present invention with end-user-installed components shown apart.
Figure 2:
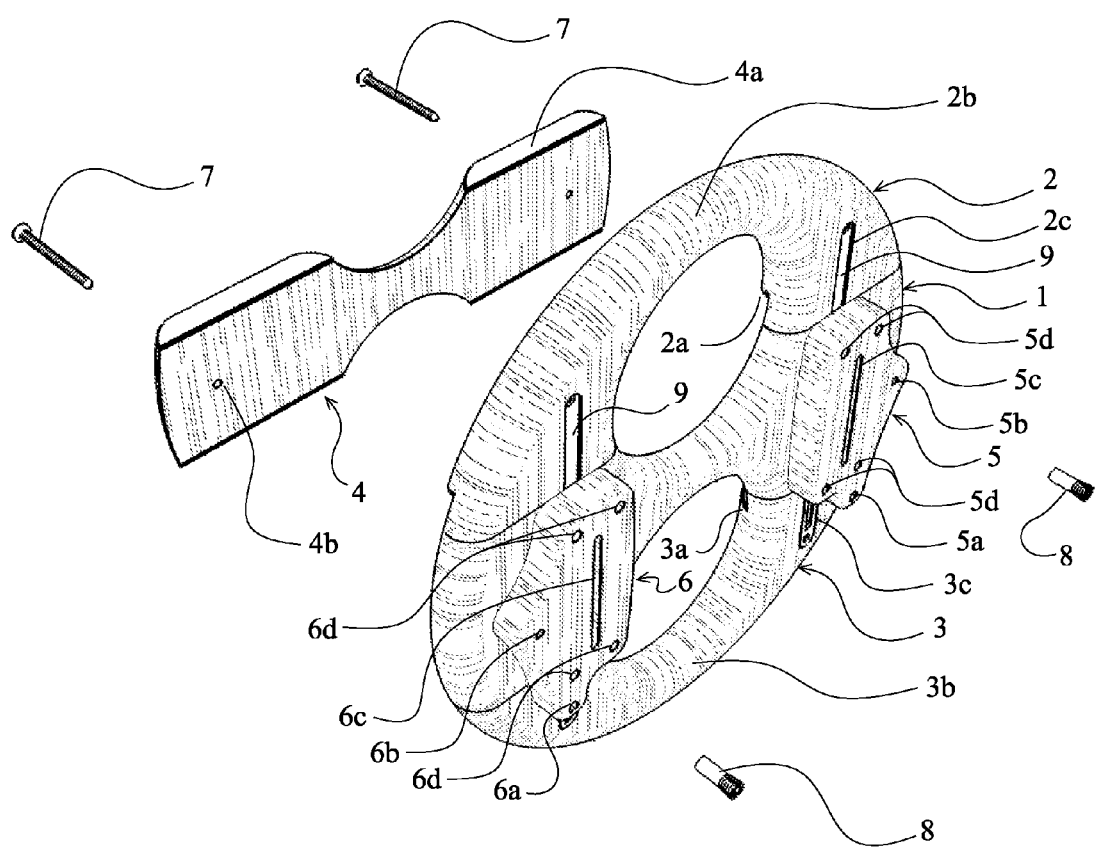
FIG. 2 illustrates a back perspective of at least one embodiment of the present invention with end-user-installed components shown apart.
Figure 3:
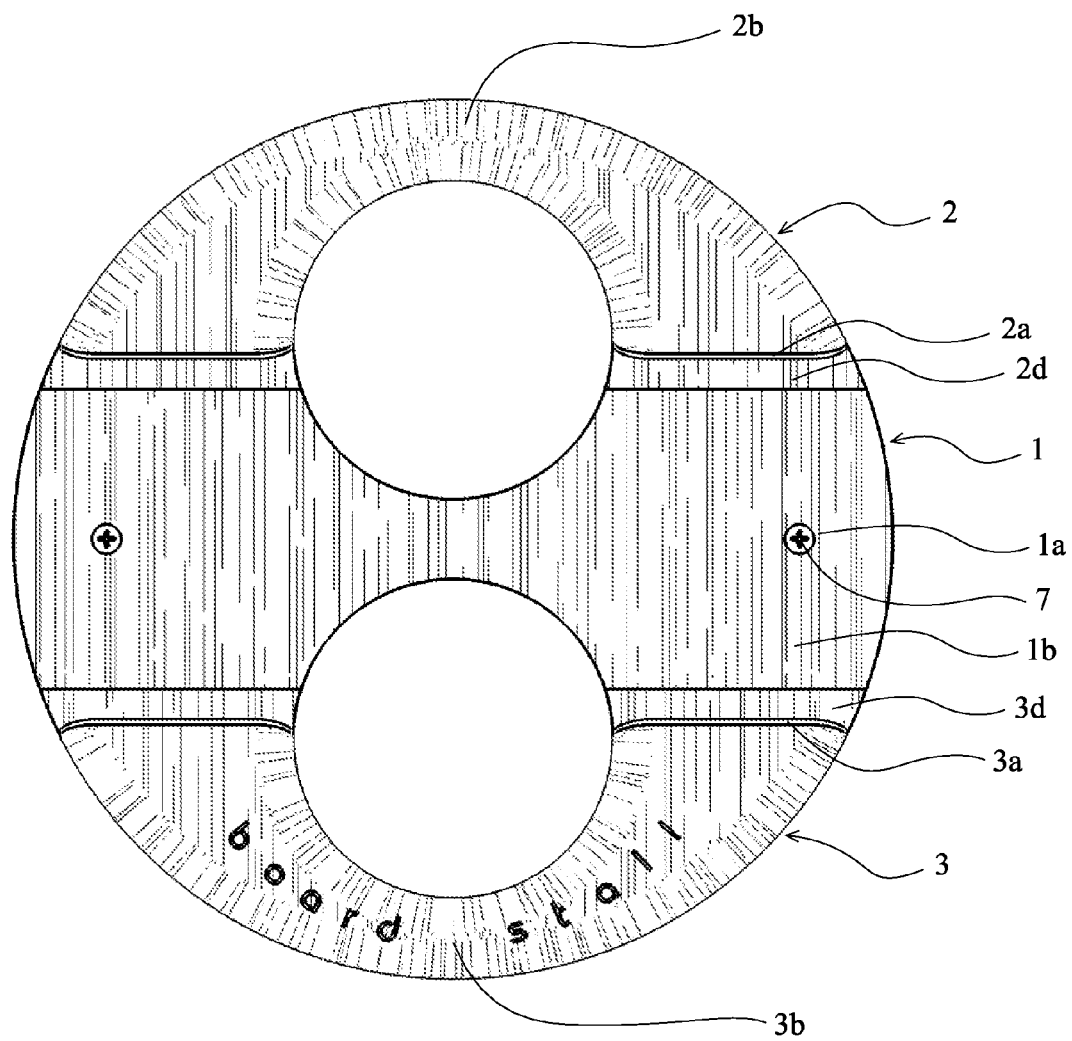
FIG. 3 illustrates the front of at least one embodiment of the present invention without double edged grip member 4.
Figure 4:
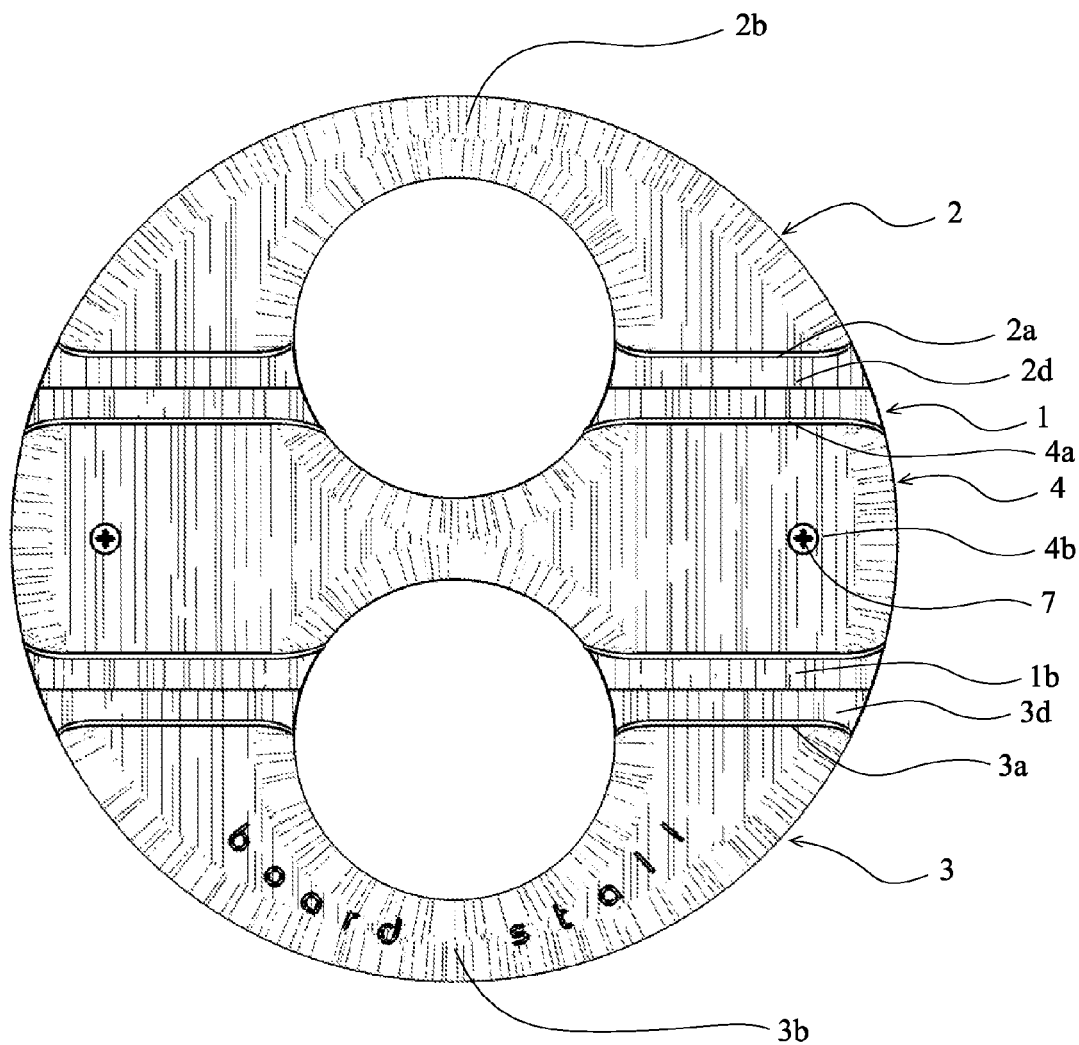
FIG. 4 illustrates the front of at least one embodiment of the present invention with double edged grip member 4.

The following is a description of the present invention, a mounting and display system for a variety of sport equipment with four embodiments described and particular elements varying in size, shape and number of elements. This should not be construed as limiting, but only as exemplary embodiments that describe the scope and spirit of the present invention.

One embodiment of the present invention is shown in FIGS. 1-10 for singular and dual boards, accommodates sporting gear including but not limited to the following: skateboards, longboards, snowboards, snowskates, wakeboards, skimboards, downhill skis, powder skis, cross country skis, skate skis and water skis.

This embodiment includes a center base member 1 that is fastened via fasteners 7 suitable to the mounting surface 13 being attached to such as a wall. The center base member 1 may be directly surface mounted or have back plate standoff members 5 and 6 of varying thicknesses to increase the displayed objects distance from the mounting surface 13. The center base member 1 contains at least one center base member attachment access 1a through which fasteners 7 pass. Center base member 1 includes a center base member interface surface 1b which contacts double edged grip member 4 when it is installed on center base member 1. Upper sliding member 2 is shown adjacent to center base member 1 including an upper sliding member grip surface 2a, which contacts a sporting gear item being securely stored by the system, an integrated upper sliding member handle 2b which provides a convenient means for a user to grip the upper sliding member 2 for extension and compression, an upper sliding member tension mechanism channel 2c is included on the reverse side of upper sliding member 2 wherein one of the double transverse sliding tension mechanisms 9 are secured to upper sliding member 2, and upper sliding member sporting gear channel 2d, which is where the sporting gear item is securely located when the system has been fully compressed by the user.

Located oppositely from upper sliding member 2, adjacent to the center base member 1 is lower sliding member 3 including a lower sliding member grip surface 3a, which contacts a sporting gear item being securely stored by the system, an integrated lower sliding member handle 3b which provides a convenient means for a user to grip the lower sliding member 3 for extension and compression, a lower sliding member tension mechanism channel 3c is included on the reverse side of lower sliding member 3 wherein one of the double transverse sliding tension mechanisms 9 are secured to lower sliding member 3, and lower sliding member sporting gear channel 3d, which is where the sporting gear item is securely located when the system has been fully compressed by the user.

Double edged grip member 4 is shown, which engages center base member 1 and is located by the fasteners 7 that pass through both center base member 1 and double edged grip member 4 using screw accesses 4b. Double edged grip member grip surface 4a is shown on two sides of double edged grip member 4, opposite from upper sliding member grip surface 2a and lower sliding member grip surface 3a. In one usage of the present system, when the upper and lower sliding members 2 and 3 are pulled apart from center base member 1, a user may place sporting gear, such as skis, such that a ski engages the lower sliding member grip surface 3 or the double edged grip member grip surface 4a, depending upon the orientation of the system. Similarly, the upper sliding member 2 is pulled apart from the center base member 1, and a ski is placed into contact with the appropriate grip surfaces. The upper and lower sliding members 2, 3 are joined to the center base member 1 by at least one double transverse sliding tension mechanism 9, which may include a spring action mechanism to pull the sliding members toward the center member, and clamp the sporting gear—skis in this example—securely and safely in place.

Figure 5:
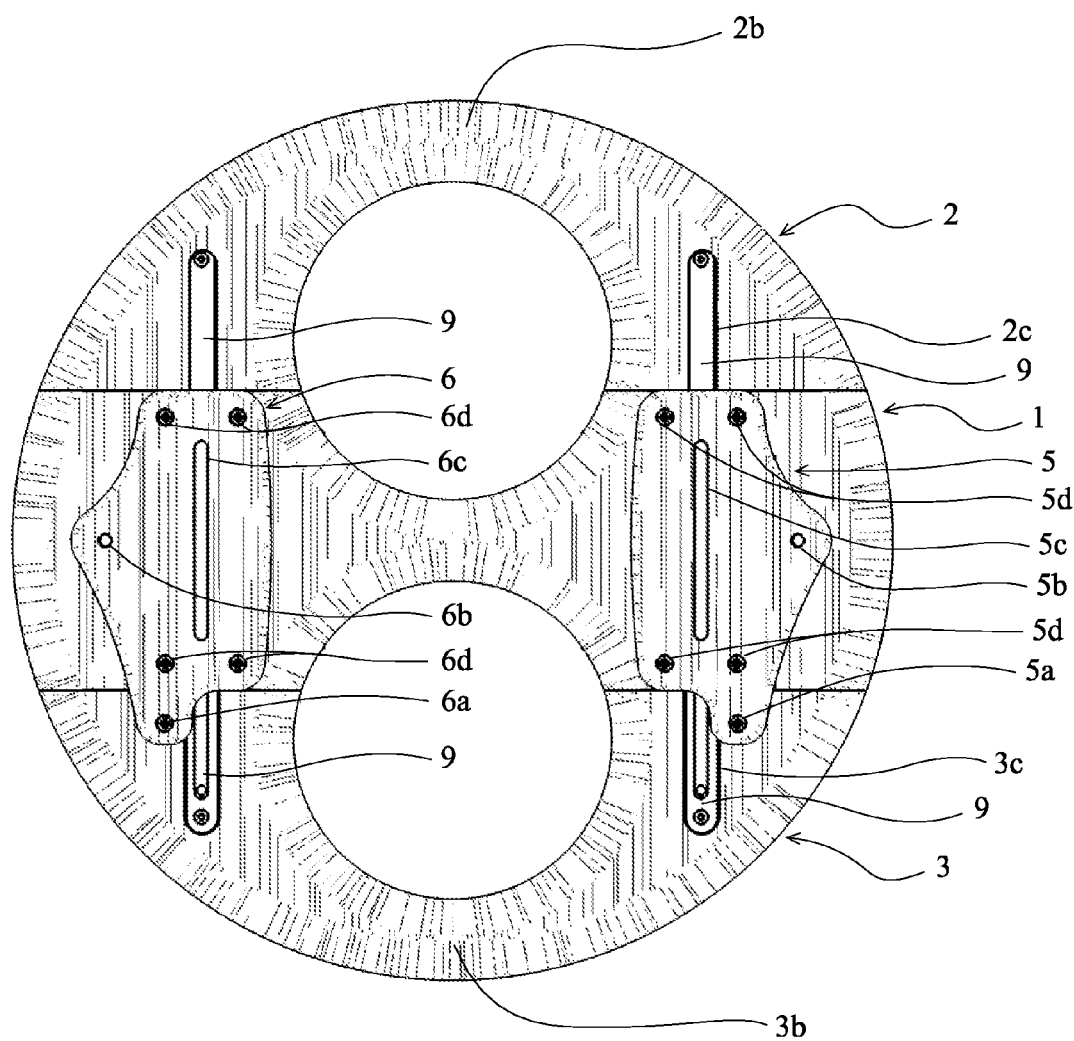
FIG. 5 illustrates the back of at least one embodiment of the present invention.
Figure 6:
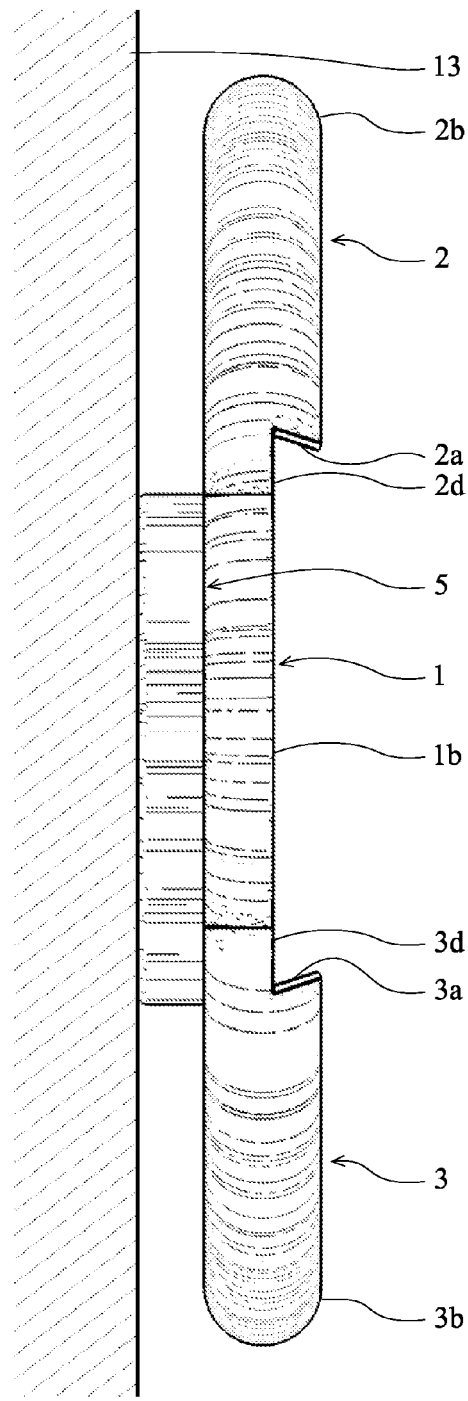
FIG. 6 illustrates the side of at least one embodiment of the present invention without double edged grip member 4.
Figure 7:
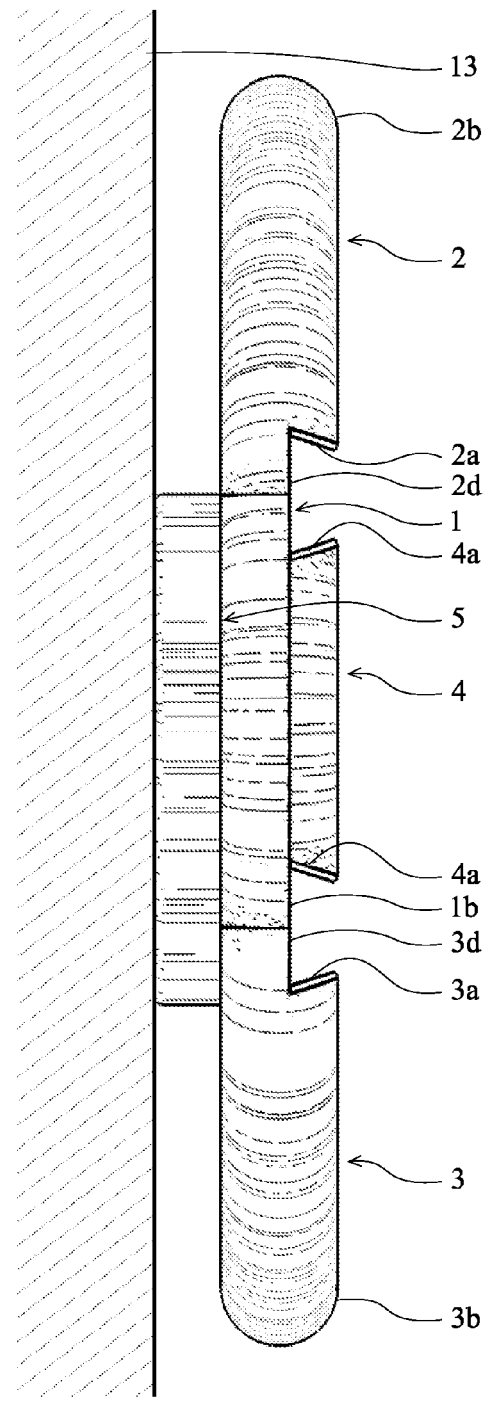
FIG. 7 illustrates the side of at least one embodiment of the present invention with double edged grip member 4.

The fasteners 7 may utilize surface mounts or anchors 8 to secure the system to a surface 13, such as a wall, table, or other suitable surface. The anchors 8 may be of type used in masonry or concrete applications, or the anchors may be of the type used with drywall or plaster, among other applications. Back plate standoff members 5 and 6 are used to position the sliding members 2 and 3, as well as the center base member 1 a particular distance from the mounting surface 13. The back plate standoff members 5 and 6 allow a user to easily insert his or her hands into the upper and lower handles 2b, 3b, to pull the sliding members apart or slide them together as desired. Standoff members 5 and 6 are optional, and the sliding members are fully functional without the use of the standoff members. FIG. 5 is an illustration of the rear of one embodiment of the present invention, showing back plate standoff members 5 and 6 in more detail. Standoff members 5 and 6 include a plurality of attachment access points 5a, 6a, and 5d and 6d. Fastener access points 5b and 6b allow fasteners 7 to pass through the system to be attached to surface 13. A pair of back plate standoff member slots 5c and 6c is also shown.

Figure 8:
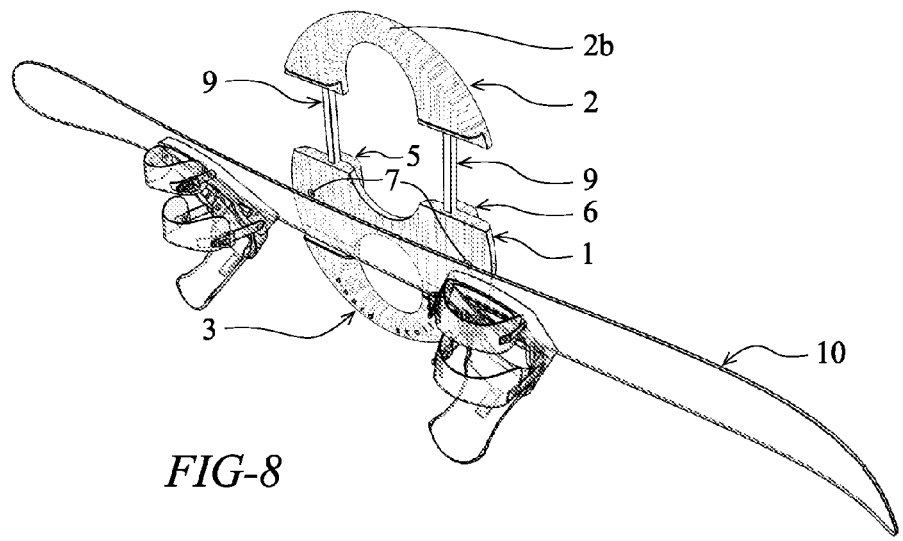
FIG. 8 illustrates the opening of the upper sliding member 2 with the initial placement of a snowboard 10 on at least one embodiment of the present invention without double edged grip member 4.
Figure 9:
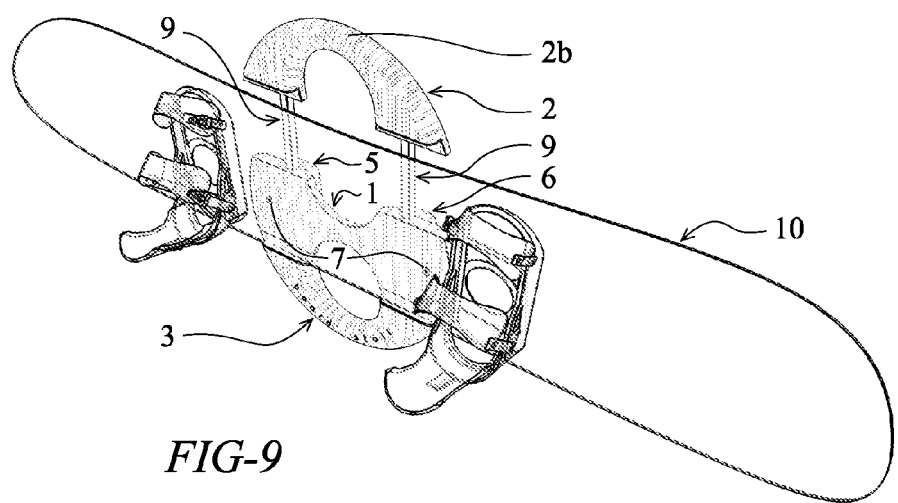
FIG. 9 illustrates the snowboard 10 in position ready for the upper sliding member 2 to be closed.
Figure 10:
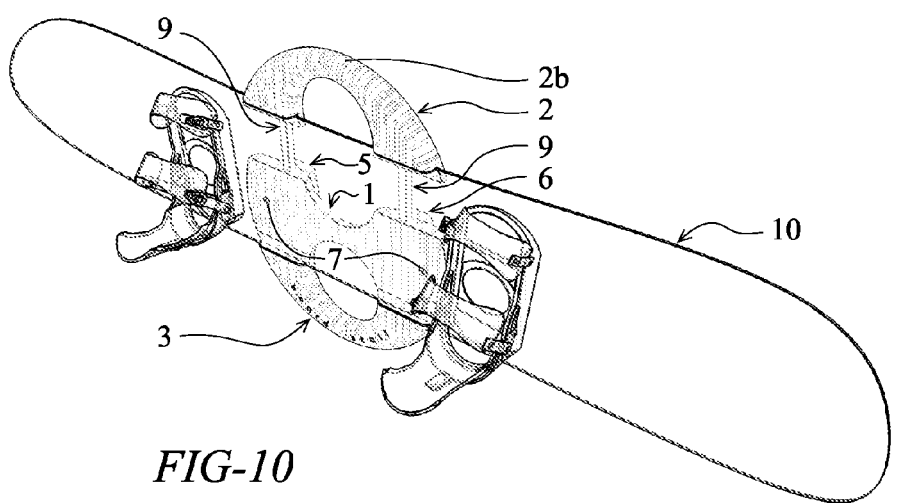
FIG. 10 illustrates the snowboard 10 held in final position with the upper sliding member 2 closed.
Figure 11:
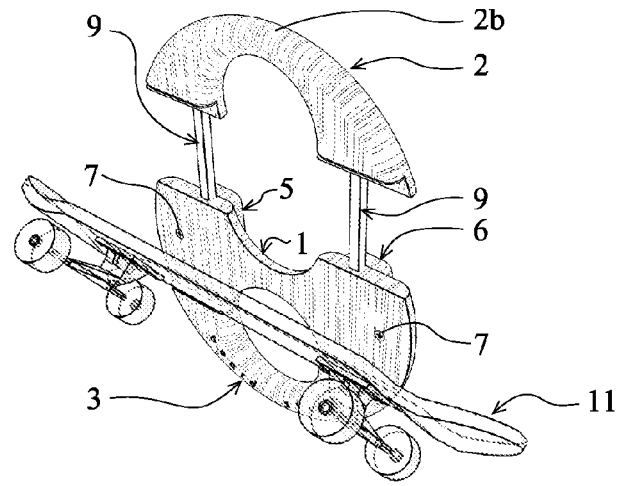
FIG. 11 illustrates the opening of the upper sliding member 2 with the initial placement of a skateboard 11 on at least one embodiment of the present invention without double edged grip member 4.
Figure 12:
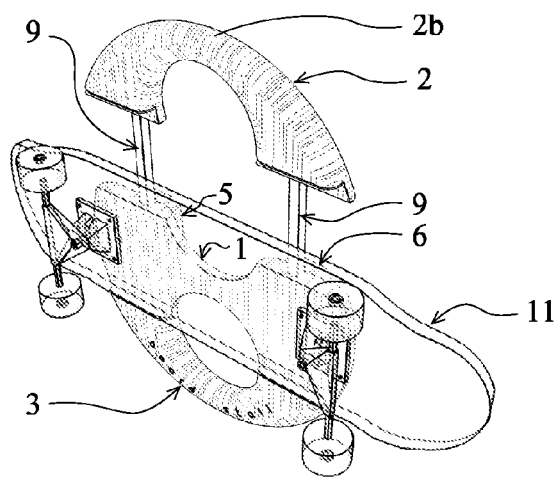
FIG. 12 illustrates the skateboard 11 in position ready for the upper sliding member 2 to be closed.
Figure 13:
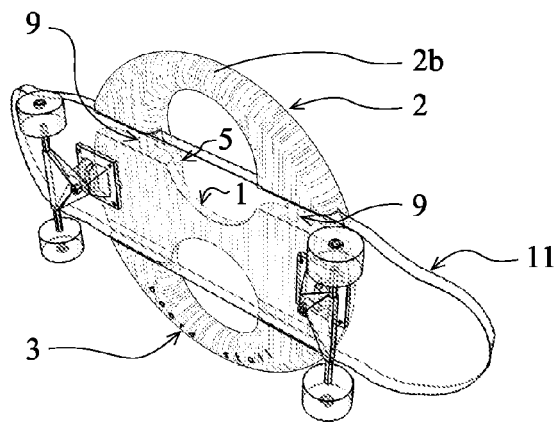
FIG. 13 illustrates the skateboard 11 held in final position with the upper sliding member 2 closed.
Figure 14:
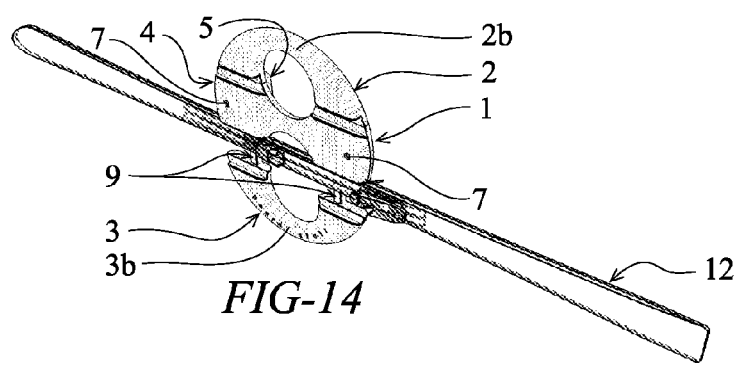
FIG. 14 illustrates the opening of the lower sliding member 3 with the placement of the first ski 12 ready for the lower sliding member 3 to be closed on at least one embodiment of the present invention with double edged grip member 4.
Figure 15:
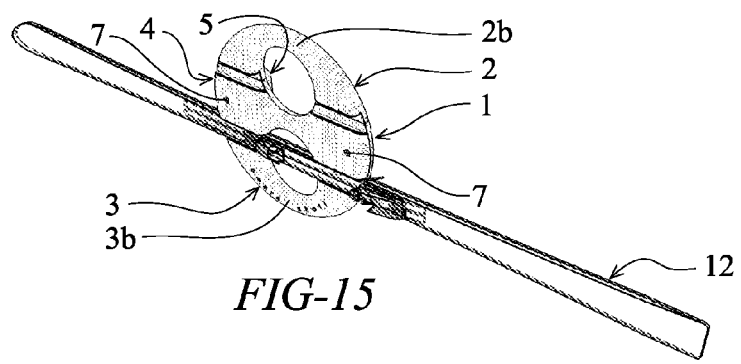
FIG. 15 illustrates the first ski 12 held in final position with the lower sliding member 3 closed.
Figure 16:
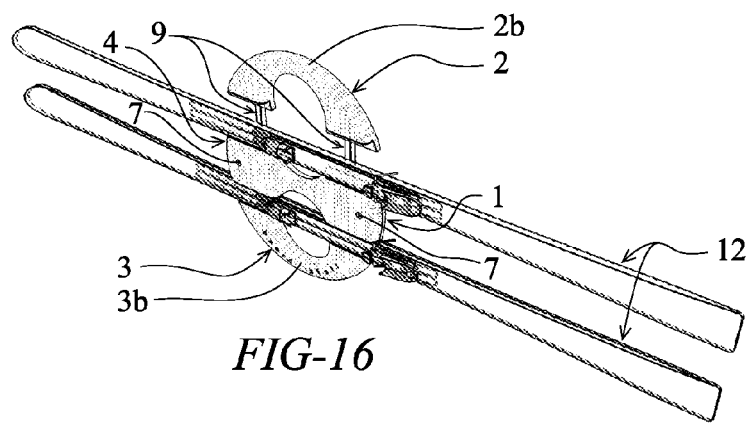
FIG. 16 illustrates the opening of the upper sliding member 2 with the placement of the second ski 12 ready for the upper sliding member 2 to be closed.
Figure 17:
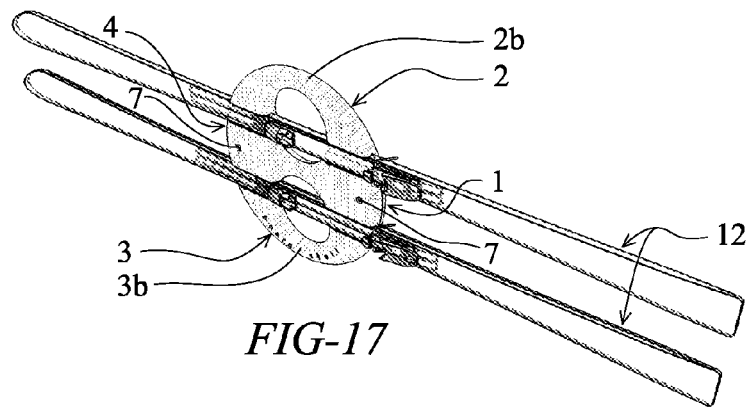
FIG. 17 illustrates both skis 12 held in final position with the upper and lower sliding members 2 and 3 closed.

FIGS. 8 through 10 show one embodiment of the present invention illustrating the installation of a sporting gear item, in this example, a snowboard 10. Upper sliding member 2 is pulled upward by gripping the handle 2b. The snowboard 10 is inserted into contact with the lower sliding member grip surface 3a of lower sliding member 3. The user then releases handle 2b, causing the double transverse sliding tension mechanisms 9 to pull upper sliding member 2 toward center base member 1 and into contact with the snowboard 10, securing snowboard 10 in place. Another example is shown in FIGS. 11 through 13, with a skateboard 11 substituted for snowboard 10.

FIGS. 14 through 17 show a pair of skis 12 being installed in one embodiment of the present invention. A user begins by pulling lower sliding member 3 using handle 3b away from center base member 1 and installing a ski into contact with lower sliding member grip surface 3a. Releasing the handle 3b, the tension mechanisms 9 pull lower sliding member 3 toward center base member 1, securely gripping ski 12. The operation is repeated for the upper sliding member 2.

FIGS. 18 and 19 show cutaway side views of one embodiment of the present invention showing double transverse sliding tension mechanisms 9 secured in upper sliding member tension mechanism channels 2c and 3c. In this embodiment, mechanisms 9 include springs to provide tension to draw the upper and lower sliding members 2 and 3 toward center base member 1 to securely hold a sporting gear item(s). In other embodiments, other types of mechanisms could be used, such as gas charged struts, or elastic bands. Alternatively, electric motors may be used in place of the sliding tension mechanism.

It is important to note that the present invention may be used to secure other items of sporting gear not shown in the above examples, which are included only to illustrate the present invention. For example, the present invention may also be used to grip other board type objects, such as surfboards; other sporting gear such as hockey sticks, golf clubs, baseball bats, cricket paddles, tennis rackets, fishing poles or other sporting items.

Two double transverse sliding tension mechanisms 9 (best shown in FIGS. 18-19) are slotted through the center base member 1 connecting the upper sliding member 2 to the lower sliding member 3 thus accommodating singular board type objects. During installation, an optional double edged grip member 4 may be added to the center base member to accommodate dual board type objects.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A sporting gear mounting and display system comprising:
   at least one center base member having a front face;
   a double transverse sliding tension mechanism inducing a compressive force creating the frictional contact needed to hold the sporting gear securely;
   an upper sliding member having an upper sliding member grip surface;

a lower sliding member having a lower sliding member grip surface;

said upper sliding member and said lower sliding member connected through said at least one center base member via said double transverse sliding tension mechanism;

a double edged grip member having two grip surfaces;

said double edged grip member fixed to said front face of said at least one center base member and dividing the space between said upper and lower sliding members in two, thus allowing two sporting gear objects to be displayed; and, said at least one center base member being wall mountable in multiple positions in order to display the sporting gear in vertical, horizontal, and diagonal orientations.

2. The system of claim 1 wherein said at least one center base member is wall mountable through at least one back plate that separates the system from the wall.

3. The system of claim 1 wherein said grip surfaces of said upper sliding member, lower sliding member, and double edged grip member are orthogonal to said center base member.

4. The system of claim 1 wherein said grip surfaces of said upper sliding member, lower sliding member, and double edged grip member are at an acute angle to said center base member to improve grip on board shaped objects with angled edges.

5. The system of claim 1 wherein said grip surfaces of said upper sliding member, lower sliding member, and double edged grip member are concavely curved to improve grip on cylindrical shaped and edged objects.

6. The system of claim 1 wherein said grip surfaces of said upper sliding member, lower sliding member, and double edged grip member are lined with a compressible material layer.

7. The system of claim 1 wherein said grip surfaces of said upper sliding member, lower sliding member, and double edged grip member are lined with a frictional material layer.

* * * * *